(12) United States Patent
Acharya et al.

(10) Patent No.: US 6,748,118 B1
(45) Date of Patent: Jun. 8, 2004

(54) METHOD OF QUANTIZING SIGNAL SAMPLES OF AN IMAGE DURING SAME

(75) Inventors: Tinku Acharya, Tempe, AZ (US); Ping-Sing Tsai, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/507,399

(22) Filed: Feb. 18, 2000

(51) Int. Cl.[7] ............................................... G06K 9/46
(52) U.S. Cl. ....................... 382/240; 382/248; 382/250
(58) Field of Search ............................... 382/240, 250, 382/166, 248; 708/407; 348/400.1, 390.1, 398.1; 375/240.1, 240.19, 240.11

(56) References Cited

U.S. PATENT DOCUMENTS

| | | | |
|---|---|---|---|
| 5,497,435 A | * 3/1996 | Berger ......................... 382/249 |
| 5,534,927 A | * 7/1996 | Shishikui et al. ......... 348/400.1 |
| 5,610,657 A | * 3/1997 | Zhang ......................... 348/415 |
| 5,812,195 A | * 9/1998 | Zhang ......................... 348/415 |
| 5,841,473 A | * 11/1998 | Chui et al. ................... 348/390 |
| 5,875,122 A | 2/1999 | Acharya ................ 364/726.05 |
| 5,995,210 A | 11/1999 | Acharya ........................ 356/73 |
| 6,009,201 A | 12/1999 | Acharya ...................... 382/232 |
| 6,009,206 A | 12/1999 | Acharya ...................... 382/251 |
| 6,047,303 A | 4/2000 | Acharya ...................... 708/407 |
| 6,091,851 A | 7/2000 | Acharya ...................... 382/167 |
| 6,094,508 A | 7/2000 | Acharya et al. ............. 382/199 |
| 6,108,453 A | 8/2000 | Acharya ...................... 382/254 |
| 6,124,811 A | 9/2000 | Acharya et al. ............... 341/63 |
| 6,130,960 A | 10/2000 | Acharya ...................... 382/167 |
| 6,151,069 A | 11/2000 | Dunton et al. .............. 348/220 |
| 6,151,415 A | 11/2000 | Acharya et al. ............. 382/255 |
| 6,154,493 A | 11/2000 | Acharya et al. ....... 375/240.19 |
| 6,166,664 A | 12/2000 | Acharya ........................ 341/63 |
| 6,178,269 B1 | 1/2001 | Acharya ...................... 382/277 |
| 6,195,026 B1 | 2/2001 | Acharya ........................ 341/60 |
| 6,215,908 B1 | 4/2001 | Pazmino et al. ............. 382/240 |
| 6,215,916 B1 | 4/2001 | Acharya ...................... 382/298 |
| 6,229,578 B1 | 5/2001 | Acharya et al. ............. 348/607 |
| 6,233,358 B1 | 5/2001 | Acharya ...................... 382/248 |
| 6,236,433 B1 | 5/2001 | Acharya et al. ............. 348/273 |
| 6,236,765 B1 | 5/2001 | Acharya ...................... 382/276 |
| 6,269,181 B1 | 7/2001 | Acharya ...................... 382/162 |
| 6,275,206 B1 | 8/2001 | Tsai et al. ....................... 345/88 |
| 6,285,796 B1 | 9/2001 | Acharya et al. ............. 382/246 |
| 6,292,114 B1 | 9/2001 | Tsai et al. ....................... 341/67 |
| 6,301,392 B1 | 10/2001 | Acharya ...................... 382/239 |
| 6,348,929 B1 | 2/2002 | Acharya et al. ............. 345/660 |
| 6,351,555 B1 | 2/2002 | Acharya et al. ............. 382/162 |
| 6,356,276 B1 | 3/2002 | Acharya ...................... 345/600 |

(List continued on next page.)

OTHER PUBLICATIONS

Acharya, "A Memory Based VLSI Architecture for Image Compression", Application No: 08/885,415, Filed: Jun. 30, 1997, Atty. docket No.: 042390.P4425, 37 Pgs.

(List continued on next page.)

*Primary Examiner*—Anh Hong Do
(74) *Attorney, Agent, or Firm*—Sharon Wong

(57) ABSTRACT

Briefly, in accordance with one embodiment of the invention, a method of quantizing signal samples of an image during image compression includes the following. A process to transform the signal samples from a first domain to a second domain is applied. During the transform process, signal samples are filter, by first applying scaled filter coefficients to signal samples along the image in a first direction and then applying scaled filter coefficients to signal samples along the image in a second direction, so that at the completion of the transform process of the image, selected regions of the transformed signal samples are quantized by a common value. Many other embodiments in accordance with the invention are also described.

23 Claims, 2 Drawing Sheets

U.S. PATENT DOCUMENTS

| | | | |
|---|---|---|---|
| 6,366,692 B1 | 4/2002 | Acharya | 382/162 |
| 6,366,694 B1 | 4/2002 | Acharya | 382/167 |
| 6,373,481 B1 | 4/2002 | Tan et al. | 345/342 |
| 6,377,280 B1 | 4/2002 | Acharya et al. | 345/667 |
| 6,381,357 B1 | 4/2002 | Tan et al. | 382/141 |
| 6,392,699 B1 | 5/2002 | Acharya | 348/273 |
| 6,560,369 B1 * | 5/2003 | Sato | 382/239 |

OTHER PUBLICATIONS

Pazmino, et al., "Method of Compressing and/or Decompressing a Data Set Using Significance Mapping", Application No.: 09/151,336, Filed: Sep. 11, 1998, Atty docket No.: 042390.P6391, 26 Pgs.

Acharya, et al., "A Fuzzy Based Thresholding Technique for Image Segmentation", Application No: 09/393,136, Filed: Sep. 10, 1999, Atty. docket No.: 042390.P7114, 28 Pgs.

Acharya, et al., "A Fuzzy Distintion Based Thresholding Technique for Image Segmentation", Application No.; 09/393,017, Filed: Sep. 10, 1999, Atty. docket No.: 042390.P7115, 29 Pgs.

Acharya, et al., "Method of Inverse Quantizing Quantized Signal Samples of an Image During Decompression", Application No.: 09/507,213, Filed: Feb. 18, 2000, Atty. docket No.: 042390.P8350, 32 Pgs.

* cited by examiner

Row-Wise  Col-Wise

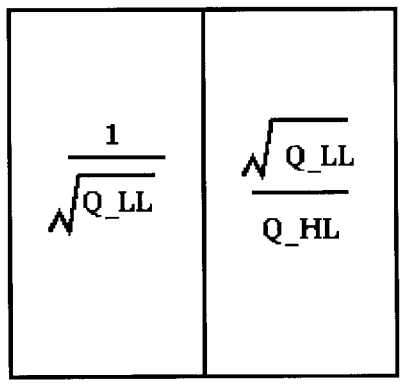 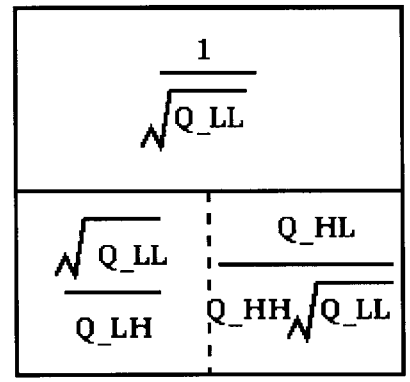

Set Q_LL equal to 1 when is not at the top level K

Figure 2

| Resolution 1 (LL1) | Resolution 1 Horizontal Orientation Sub-Image (HL1) | Low-Frequency Coefficients (LL2) | Resolution 2 Horizontal Orientation (HL2) | Resolution 1 Horizontal Orientation (HL1) |
|---|---|---|---|---|
| | | Resolution 2 Vertical Orientation (LH2) | Resolution 2 Diagonal Orientation (HH2) | |
| Resolution 1 Vertical Orientation Sub-Image (LH1) | Resolution 1 Diagonal Orientation Sub-Image (HH1) | Resolution 1 Vertical Orientation (LH1) | | Resolution 1 Diagonal Orientation (HH1) |

METHOD OF QUANTIZING SIGNAL SAMPLES OF AN IMAGE DURING SAME

RELATED APPLICATION

This patent application is related to concurrently filed U.S. patent application Ser. No. 09/507,213, titled "Method of Inverse Quantizing Signal Samples of an Image During Image Decompression," by Acharya et al., assigned to the assignee of the current invention and herein incorporated by reference.

BACKGROUND

This disclosure relates to image compression and, more particularly, to quantizing signal samples of an image during image compression.

As is well-known, in a variety of situations, it is desirable to have the ability to compress an image or a sequence of images. Without limitation, this may be desirable, for example, for transmission over a limited bandwidth communications channel, or for efficient storage of an image so it may later be retrieved.

As is also well-known, image compression is typically computationally intensive and also employs a variety of operations in order to accomplish the end result, namely compression. For example, typically the image is transformed into another domain, such as from the spatial domain to the frequency domain, and, likewise, typically some form of quantization is employed. These are just two examples of the operations that may be performed upon the signal samples of an image in order to accomplish image compression. Additional operations may include entropy encoding, etc.

Typically, each of these operations is computationally intensive. Therefore, if these operations are performed in software, a relatively large amount of processing power may be employed in order to perform the compression. Likewise, if, alternatively, these operations are performed using hardware, typically, separate hardware elements may be employed to perform each operation, to pipeline the processing, for example. A need, therefore, exists to reduce the amount of computationally intensive operations or the number of separate hardware elements employed to perform image compression.

BRIEF DESCRIPTION OF DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description when read with the accompanying drawings in which:

FIG. 2 is a schematic diagram illustrating an embodiment of a method of quantizing signal samples of an image during image compression in which a scaling operation is demonstrated; and FIG. 3 is a schematic diagram illustrating results of applying a Discrete Wavelet Transform (DWT) to an image where multiple or multi-levels are produced.

DETAILED DESCRIPTION

Figure 1:
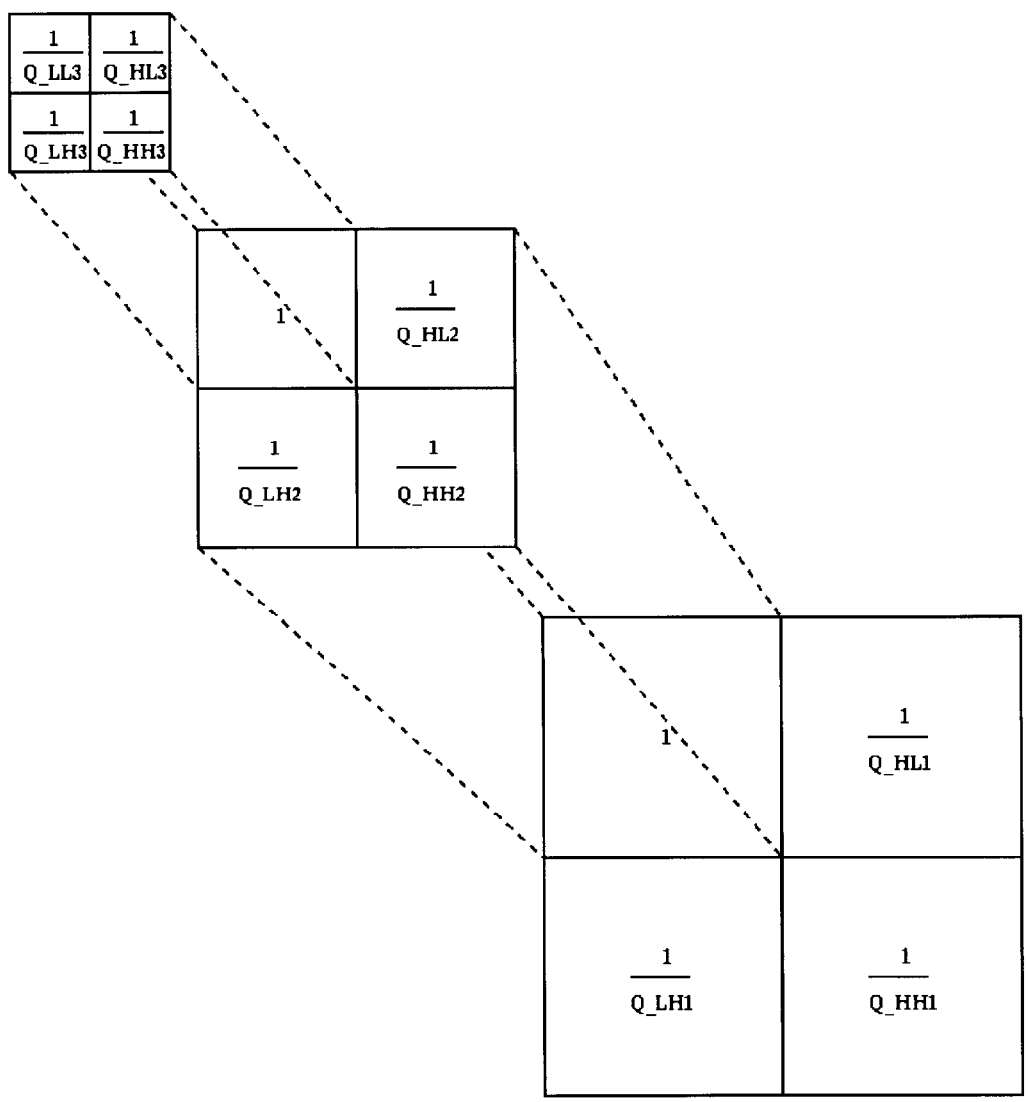
FIG. 1 is a diagram schematically illustrating a process of applying an embodiment of a method for quantizing signal samples of an image during image compression in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

As previously indicated, one operation applied to accomplish compression of an image is transformation of an image from a first domain, such as a spatial domain, to a second domain, such as a frequency domain, although, of course, the invention is not limited in scope to transforming between these two particular domains. One common transformation employed in image compression is a Discrete Wavelet Transform (DWT) and also a multi-level DWT. Again, although the invention is not limited in scope in this respect, typically, for image compression, a two-dimensional DWT is employed. This is illustrated in more detail in FIG. 3.

Where the DWT is applied, the original image is decomposed into four subbands, illustrated, for example, by FIG. 3(a). For a multi-level DWT, for example, this is referred to as a level of decomposition, and a subband at this level of decomposition may be further decomposed to produce another level of decomposition, illustrated, for example, by FIG. 3(b). In FIG. 3, the LL subband of FIG. 3(a), such as LL1, is further decomposed as shown in FIG. 3(b).

As illustrated, for example, by FIG. 3(a), the subbands are divided in the horizontal and the vertical direction, in this particular example according to frequency, with one half compromising the low frequency subband and the other half comprising the high frequency subband. Therefore, four different combinations of subbands result as illustrated, referred to as LL, LH, HL, and HH subbands, where L refers to low frequency signal information and H refers to high frequency signal information. It is generally understood that most of the basic signal information of the image is present in the low frequency LL subband, such as LL1. In a multi-level DWT, as previously indicated, the LL subband may be further decomposed, and this process may be taken to several levels, if desired. In this context, we shall designate the overall total number of levels of decomposition as K.

Typically, in image compression, once the DWT has been applied to the image and the so-called "transformed coefficients" have been obtained, the signal samples are then quantized based, at least in part, on subband location. It is desirable in a situation, such as this, to employ uniform scaling or quantization, meaning, in this context, that the transformed coefficients in a particular or selected subband are quantized based upon the same or substantially the same quantization value.

Quantization is desirable in image compression because it operates as another approach to filter the more useful information of the image from the less useful information of the image based, at least in part, on selected characteristics of a human vision system. Scalar quantization is performed by dividing a coefficient in the subband by a quantization or threshold value, Q. The nearest integer obtained after rounding or truncation, depending upon the implementation, for example, is the quantized coefficient. Trade-offs or the selection of implementation details may, of course, be made for a variety of different reasons, such as accuracy or complexity, and, the invention is not limited in scope to a particular implementation detail, such as whether rounding or truncation is employed or how it may specifically be carried out.

As previously indicated, these operations are typically performed separately and may either result in a relatively high amount of computational complexity or, alternatively, may, in some cases, employ separate pieces of circuitry to perform the separate operations. Separating these operations in this manner, therefore, may result in lower performance in terms of speed and/or greater expense in terms of the amount or size of the silicon die where, for example, the operation is implemented through circuitry on an integrated circuit. It would, therefore, be desirable, for a variety of reasons, if the number of separate operations performed during image compression could be reduced.

FIG. 2 illustrates the application of an embodiment of a method of quantizing signal samples of an image during image compression in accordance with the present invention. In this particular embodiment, a process is applied to transform signal samples of the image from a first domain to a second domain such as, for example, as previously described, from the spatial domain to the frequency domain. However, in this particular embodiment, during the transformation process, signal samples are filtered by applying scaled or pre-scaled filter coefficients. Signal samples are filtered by applying pre-scaled filter coefficients along the image first in one direction such as, for example, row-wise, in this particular embodiment. This is illustrated by the left portion of FIG. 2. Therefore, as rows of the image are decomposed into high and low frequency components, those components are also filtered by scaled or pre-scaled filter coefficients in accordance with the factors illustrated in FIG. 2, for this particular embodiment. In this embodiment, once the row-wise decomposition and filtering with scaled filter coefficients has been completed, it is then performed in a second direction, such as column-wise. Again, columns are decomposed into high and low frequency components and, likewise, the signal samples of those high and low frequency components are filtered with coefficients scaled in the manner illustrated by the right portion of FIG. 2. It will, of course, be appreciated that the invention is not limited in scope to this particular embodiment. For example, in other embodiments, alternatively decomposition and filtering with scaled or pre-scaled coefficients may be performed column-wise and then row-wise or in other alternative directions. Likewise, depending on the particular embodiment or approach, it may be that not all filter coefficients are scaled, for example. A variety of different approaches to scale the filter coefficients or portions thereof, for example, may be employed. It is noted, however, that in this particular embodiment the two directions, horizontal and vertical, or row-wise and column-wise here, are mutually orthogonal, providing some benefit in terms of implementation because the two-dimensional scaling function may be expressed as a separable function. It shall be demonstrated hereinafter, when, for this particular embodiment, a transformation process of the image is complete, selected regions of the transformed signal samples, in this particular embodiment, the respective regions LL, HL, LH, and HH, are quantized by a common value.

In this particular embodiment, although the invention is not limited in scope in this respect, decomposition of an arbitrary sequence $x=\{x_0, x_1, \ldots, x_{N-1}\}$ into a low pass subband $a=\{a_0, a_1, \ldots, a_{(N/2)-1}\}$ and a high pass subband $c=\{c_0, c_1, \ldots, c_{(N/2)-1}\}$ using 9-7 biorthogonal spline filters, for example, may be represented as follows:

$$a_n = \sum_{i=0}^{8} l_i \cdot x_{2n-i} \quad [1]$$

$$c_n = \sum_{i=0}^{6} h_i \cdot x_{2n-i} \quad [2]$$

where $I=\{I_0, I_1, \ldots, I_8\}$ and $h=\{h_0, h_1, \ldots, h_6\}$ are, respectively, the 9-tap low pass and the 7-tap high pass filter coefficients.

This is one technique for employing a two-dimensional DWT, although other approaches of implementing a two-dimensional DWT may be employed. For example, one may apply any 2-D filter as long as the filter may be decomposed into two 1-D filters. The expressions for the scaling factors remain the same. Likewise, a simple approach in this embodiment is to perform the decomposition row-wise and then column-wise, as previously described, although the invention is not limited in scope in this respect. As previously indicated, this is possible because, for this embodiment, the two-dimensional scaling function may be expressed as a separable function, that is, in this embodiment, the product of two one dimensional scaling functions.

It is likewise noted that, depending upon the particular embodiment, this method may be applied on multi-levels. For a K level two-dimensional DWT pyramid, where K is a positive integer, the filtering in the $k_{th}$ level may be performed in the following manner:

First, at each level of DWT, set Q $(LL_k)=1$ when level k is less than K.

Row-wise, One-dimensional DWT

For low pass filtering over the $LL_{k-1}$ subband or the input image when k=1, each filter coefficient, $I_i$, is scaled by the factor:

$$\frac{1}{\sqrt{Q(LL_k)}}$$

For high pass filtering over the $LL_{k-1}$ subband or the input image when k=1, each filter coefficient, $h_i$, is scaled by the factor:

$$\frac{\sqrt{Q(LL_k)}}{Q(HL_k)}$$

Column-wise One-dimensional DWT

For low pass filtering to generate subbands, $LL_k$ and $HL_k$, each weight of the filter, $I_i$, is scaled by the factor:

$$\frac{1}{\sqrt{Q(LL_k)}}$$

For high pass filtering to generate the subband, $LH_k$, each weight of the filter, $h_i$, is scaled by the factor:

$$\frac{\sqrt{Q(LL_k)}}{Q(LH_k)}$$

For high pass filtering to generate subband $HH_k$, each weight of the filter, $h_i$, is scaled by the factor:

$$\frac{Q(HL_k)}{Q(HH_k)\sqrt{Q(LL_k)}}$$

where Q (HL$_k$), Q (HH$_k$), Q (LH$_k$), and Q (LL$_k$) are the quantization thresholds of the subbands, HL, HH, LH, and LL in the k$^{th}$ level, respectively. FIG. 2 shows the corresponding scaling factors in terms of these subband locations, as previously described, where, for example, Q(LL$_k$) for the k$^{th}$ level is designated as Q_LL.

After mathematical manipulation, it may be demonstrated that after the row-wise and column-wise filtering of the four subbands at any level, the following scaling factors result:

LL subband at level $k$: $\frac{1}{\sqrt{Q(LL_k)}} \frac{1}{\sqrt{Q(LL_k)}} = \frac{1}{Q(LL_k)}$ when $k = K$, or 1 when $k < K$;

HL subband at level $k$: $\frac{\sqrt{Q(LL_k)}}{Q(HL_k)} \frac{1}{\sqrt{Q(LL_k)}} = \frac{1}{Q(HL_k)}$;

LH subband at level $k$: $\frac{1}{\sqrt{Q(LL_k)}} \frac{\sqrt{Q(LL_k)}}{Q(LH_k)} = \frac{1}{Q(LH_k)}$;

HH subband at level $k$: $\frac{\sqrt{Q(LL_k)}}{Q(HL_k)} \frac{Q(HL_k)}{Q(HH_k)\sqrt{Q(LL_k)}} = \frac{1}{Q(HH_k)}$.

Therefore, the desired scaling or quantization in designated or selected regions has been accomplished. FIG. 1 is an example illustrating a process where this embodiment is applied for K=3.

As previously demonstrated, for this particular embodiment of a method of quantizing signal samples of an image during image compression, uniform scaling or quantization has been integrated into a multi-level DWT transformation. As a result, quantization circuitry may be eliminated. This may, therefore, result in a smaller silicon die for an integrated circuit, potentially reducing cost and improving speed. A similar approach may be applied for a software implementation in order to reduce computational "costs" and achieve faster execution of a DWT based image compression technique, for example.

As previously indicated, it will be appreciated that many different embodiments are within the scope of the present invention. For example, although a method of quantizing signal samples of an image during image compression in accordance with the present invention is described, alternatively, an embodiment may comprise, for example, a device, such as, for example, an integrated circuit. In such an embodiment, the integrated circuit may, for example, include input ports to receive signal samples associated with at least one image and the integrated circuit may include digital circuitry, although, of course, the invention is not limited in scope in this respect. The digital circuitry may have a configuration to apply a process to transform the signal samples from a first domain to a second domain and, during the transform process, filter signal samples, by first applying scaled filter coefficients to signal samples along the image in a first direction and then applying scaled filter coefficients to signal samples along the image in a second direction, so that, at the completion of the transform process of the image, selected regions of the transformed signal samples are quantized by a common value. Likewise, other aspects of the previously described embodiment, for example, may be included, although, again, the invention is not limited in scope in this respect. Additionally, features not previously described may be included in an embodiment in accordance with the invention.

Likewise, yet another an alternative embodiment may comprise an article, such as a storage medium, having stored thereon, instructions, that, when executed by a system to execute such instructions, for example, may result in the previously described method embodiment being performed. For example, although the invention is not limited in scope in this respect, the system may comprise a computer, such as a personal computer, a set-top box, a server, or anyone of a number of other systems that may be adapted to execute specific instructions stored on a storage medium.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of quantizing signal samples of an image during image compression comprising:
   applying a process to transform the signal samples from a first domain to a second domain; and
   during the transform process, filtering signal samples, by first applying scaled filter coefficients to signal samples along the image in a first direction and then applying scaled filter coefficients to signal samples along the image in a second direction, so that at the completion of the transform process of the image, selected regions of the transformed signal samples are quantized by a common value, the selected regions are the LL, LH, HL, and HH subbands of the transformed image, and the quantization is substantially in accordance with the following form:

LL subband at level $k$: $\frac{1}{\sqrt{Q(LL_k)}} \frac{1}{\sqrt{Q(LL_k)}} = \frac{1}{Q(LL_k)}$ when $k = K$, or 1 when $k < K$;

HL subband at level $k$: $\frac{\sqrt{Q(LL_k)}}{Q(HL_k)} \frac{1}{\sqrt{Q(LL_k)}} = \frac{1}{Q(HL_k)}$;

LH subband at level $k$: $\frac{1}{\sqrt{Q(LL_k)}} \frac{\sqrt{Q(LL_k)}}{Q(LH_k)} = \frac{1}{Q(LH_k)}$;

HH subband at level $k$: $\frac{\sqrt{Q(LL_k)}}{Q(HL_k)} \frac{Q(HL_k)}{Q(HH_k)\sqrt{Q(LL_k)}} = \frac{1}{Q(HH_k)}$;

K being the total level of the DWT and k being a positive integer less than or equal to K.

2. The method of claim 1, wherein the first and second directions are mutually orthogonal.

3. The method of claim 1, wherein the transform process comprises a discrete wavelet transform (DWT), the first domain is the spatial domain, the second domain is the frequency domain, the first direction is one of row-wise and column-wise.

4. The method of claim 3, wherein the DWT comprises a two-dimensional DWT.

5. The method of claim 1, wherein the transform process comprises a decomposition into mutually orthogonal directions, the decomposition being into low pass and a high pass subbands.

6. The method of claim 5, wherein the decomposition comprises a decomposition by biorthogonal spline filters.

7. The method of claim 6, wherein the spline filters comprise 9–7 biorthogonal spline filters.

8. The method of claim 1, and further comprising applying a second level of transformation and scaling to the LL subband of the transformed image.

9. The method of claim 1, and further comprising applying a kth level of filtering and scaling by successively applying, k−1 times, filtering and scaling to the LL subband of the transformed image, k being a positive integer.

10. The method of claim 1, wherein the method of quantization is applied to successive video image frames.

11. The method of claim 1, wherein the signal samples are quantized by truncating the signal sample values.

12. The method of claim 1, wherein the signal samples are quantized by rounding the signal sample values.

13. A method of quantizing signal samples of an image during image compression comprising:

applying a process to transform the signal samples from a first domain to a second domain; and during the transform process, filtering signal samples, by first applying scaled filter coefficients to signal samples along the image in a first direction and then applying scaled filter coefficients to signal samples along the image in a second direction, so that at the completion of the transform process of the image, selected regions of the transformed signal samples are quantized by a common value, the transform process comprises a discrete wavelet transform (DWT), the selected regions are the LL, LH, HL, and HH subbands of the transformed image, scaling in a first direction comprises:
applying the scale factor $$\frac{1}{\sqrt{Q(LL_k)}}$$

to each filter coefficient in the low pass filtering operation over the $LL_{k-1}$ subband; and
applying the scale factor $$\frac{\sqrt{Q(LL_k)}}{Q(HL_k)}$$

to each filter coefficient in the high pass filtering operation over the $LL_{k-1}$ subband;

Q ($HL_k$) and Q ($LL_k$) being the quantization thresholds of the subbands, HL and LL in the $k^{th}$ level, respectively, K being the total level of the DWT, k being a positive integer less than or equal to K, Q ($LL_k$) being 1 when k is less than K, and $LL_1$ being the input image.

14. A method of quantizing signal samples of an image during image compression comprising:

applying a process to transform the signal samples from a first domain to a second domain; and during the transform process, filtering signal samples, by first applying scaled filter coefficients to signal samples along the image in a first direction and then applying scaled filter coefficients to signal samples along the image in a second direction, so that at the completion of the transform process of the image, selected regions of the transformed signal samples are quantized by a common value, the transform process comprises a discrete wavelet transform (DWT), the selected regions are the LL, LH, HL, and HH subbands of the transformed image, scaling in the second mutually orthogonal direction comprises:
applying the scale factor $$\frac{1}{\sqrt{Q(LL_k)}}$$

to each filter coefficient in the low pass filtering operation to generate subbands $LL_k$ and $HL_k$;
applying the scale factor $$\frac{\sqrt{Q(LL_k)}}{Q(LH_k)}$$

to each filter coefficient in the high pass filtering operation to generate subband $LH_k$; and
applying the scale factor $$\frac{Q(HL_k)}{Q(HH_k)\sqrt{Q(LL_k)}}$$

to each filter coefficient in the high pass filtering operation to generate subband $HH_k$;

Q ($HL_k$), Q ($HH_k$), Q ($LH_k$), and Q ($LL_k$) being the quantization thresholds of the subbands, HL, HH, LH, and LL in the $k^{th}$ level, respectively, and Q ($LL_k$) being equal to 1, when level k is less than K.

15. A device comprising:

an integrated circuit;

said integrated circuit having input ports to receive signal samples associated with at least one image;

said integrated circuit including digital circuitry;

said digital circuitry having a configuration to apply a process to transform the signal samples from a first domain to a second domain and during the transform process, filtering signal samples, by first applying scaled filter coefficients to signal samples along the image in a first direction and then applying scaled filter coefficients to signal samples along the image in a second direction, so that at the completion of the transform process of the image, selected regions of the transformed signal samples are quantized by a value, the selected regions are the LL, LH, HL, and HH subbands of the transformed image, scaling in the second mutually orthogonal direction comprises:
applying the scale factor $$\frac{1}{\sqrt{Q(LL_k)}}$$

to each filter coefficient in the low pass filtering operation to generate subbands $LL_k$ and $HL_k$;
applying the scale factor $$\frac{\sqrt{Q(LL_k)}}{Q(LH_k)}$$

to each filter coefficient in the high pass filtering operation to generate subband $LH_k$; and applying the scale factor $$\frac{Q(HL_k)}{Q(HH_k)\sqrt{Q(LL_k)}}$$

to each filter coefficient in the high pass filtering operation to generate subband $HH_k$;

Q ($HL_k$), Q ($HH_k$), Q ($LH_k$), and Q ($LL_k$) being the quantization thresholds of the subbands, HL, HH, LH, and LL in the $k^{th}$ level, respectively, and Q ($LL_k$) being equal to 1, when level k is less than K.

16. The device of claim 15, wherein the first direction and the second direction are mutually orthogonal.

17. The device of claim 15, wherein the transform process comprises a discrete wavelet transform (DWT), the first domain is the spatial domain, the second domain is the frequency domain, the first direction is one of row-wise and column-wise, the second direction is the other of row-wise and column-wise.

18. The device of claim 17, wherein the DWT comprises a two-dimensional DWT.

19. The device of claim 15, wherein the transform process comprises a decomposition into mutually orthogonal directions, the decomposition being into low pass and a high pass subbands.

20. An article comprising: a storage medium, said storage medium having stored thereon, instructions, that when executed by a system to execute said instructions, results in:

applying a process to transform signal samples associated with at least one image from a first domain to a second domain; and during the transform process, filtering signal samples, by first applying scaled filter coefficients to signal samples along the image in a first direction and then applying scaled filter coefficients to signal samples along the image in a second direction, so that at the completion of the transform process of the image, selected regions of the transformed signal samples are quantized by a value, scaling in the second mutually orthogonal direction comprises:

applying the scale factor $$\frac{1}{\sqrt{Q(LL_k)}}$$

to each filter coefficient in the low pass filtering operation to generate subbands $LL_k$ and $HL_k$;

applying the scale factor $$\frac{\sqrt{Q(LL_k)}}{Q(LH_k)}$$

to each filter coefficient in the high pass filtering operation to generate subband $LH_k$; and applying the scale factor $$\frac{Q(HL_k)}{Q(HH_k)\sqrt{Q(LL_k)}}$$

to each filter coefficient in the high pass filtering operation to generate subband $HH_k$;

Q ($HL_k$), Q ($HH_k$), Q ($LH_k$), and Q ($LL_k$) being the quantization thresholds of the subbands, HL, HH, LH, and LL in the $k^{th}$ level, respectively, and Q ($LL_k$) being equal to 1, when level k is less than K.

21. The article of claim 20, wherein the transform process comprises a discrete wavelet transform (DWT), the first domain is the spatial domain, the second domain is the frequency domain, the first direction is one of row-wise and column-wise, the second direction is the other of row-wise and column-wise.

22. The article of claim 20, wherein the DWT comprises a two-dimensional DWT.

23. The article of claim 20, wherein the transform process comprises a decomposition into mutually orthogonal directions, the decomposition being into low pass and a high pass subbands.

* * * * *